(12) United States Patent
Mehring et al.

(10) Patent No.: US 11,113,645 B2
(45) Date of Patent: *Sep. 7, 2021

(54) INTELLIGENT ROUTING CODE FOR IMPROVED PRODUCT DISTRIBUTION

(71) Applicant: Zest Labs, Inc., San Jose, CA (US)

(72) Inventors: Peter Mehring, Los Altos, CA (US); Thomas Reese, Ellicott City, MD (US)

(73) Assignee: ZEST LABS, INC., San Jose, CA (US)

( * ) Notice: Subject to any disclaimer, the term of this patent is extended or adjusted under 35 U.S.C. 154(b) by 83 days.

This patent is subject to a terminal disclaimer.

(21) Appl. No.: 16/360,905

(22) Filed: Mar. 21, 2019

(65) Prior Publication Data
US 2019/0295019 A1 Sep. 26, 2019

Related U.S. Application Data

(63) Continuation of application No. 14/729,713, filed on Jun. 3, 2015.
(Continued)

(51) Int. Cl.
*G06Q 10/06* (2012.01)
*G06Q 10/08* (2012.01)
(Continued)

(52) U.S. Cl.
CPC . *G06Q 10/06313* (2013.01); *G06Q 10/06395* (2013.01); *G06Q 10/087* (2013.01); *G06Q 10/0832* (2013.01); *G06Q 10/0833* (2013.01); *G01K 3/04* (2013.01); *G06K 19/0717* (2013.01); *G06Q 10/08* (2013.01)

(58) Field of Classification Search
None
See application file for complete search history.

(56) References Cited

U.S. PATENT DOCUMENTS

| 6,622,127 B1 * | 9/2003 | Klots | G06Q 10/06 |
| | | | 705/28 |
| 2004/0124977 A1 * | 7/2004 | Biffar | G06Q 10/08 |
| | | | 340/539.13 |

(Continued)

OTHER PUBLICATIONS

Regattieri, "Traceability of food products: General framework and experimental evidence," 2007, Journal of Food Engineering, vol. 81, pp. 347-356 (Year: 2007).*
(Continued)

*Primary Examiner* — Ivan R Goldberg
(74) *Attorney, Agent, or Firm* — Zilka-Kotab, P.C.

(57) ABSTRACT

A computer-implemented method for managing a product delivery process, according to one embodiment, includes receiving an actual Intelligent Routing (IR) code for a good, the good being a perishable food product. A target IR code for each of at least two receivers is also received. The actual IR code for the good is compared to the target IR codes for each of the at least two receivers. Based on the comparison of the actual IR code for the good to the target IR codes for each of the at least two receivers, a determination as to which receiver of the at least two receivers will receive the good, and the result is output. The actual IR code is updated based on sensor data received from a sensor coupled to the good, and recompared to the target IR codes for each of the at least two receivers.

24 Claims, 6 Drawing Sheets

Related U.S. Application Data

(60) Provisional application No. 62/007,225, filed on Jun. 3, 2014.

(51) Int. Cl.
*G06K 19/07* (2006.01)
*G01K 3/04* (2006.01)

(56) References Cited

U.S. PATENT DOCUMENTS

| | | | | |
|---|---|---|---|---|
| 2004/0148117 A1* | 7/2004 | Kirshenbaum | ........... | G07C 1/00 702/82 |
| 2004/0254842 A1* | 12/2004 | Kirkegaard | ........... | G06Q 10/063 705/22 |
| 2005/0261991 A1* | 11/2005 | Kennamer | ............. | G06Q 10/08 705/28 |
| 2006/0145863 A1* | 7/2006 | Martin | ..................... | G01K 3/04 340/572.8 |
| 2006/0218058 A1* | 9/2006 | Wojcik | ............... | G06Q 30/0601 705/28 |
| 2008/0052044 A1* | 2/2008 | Shoenfeld | .......... | G07C 9/00896 702/188 |
| 2009/0230182 A1* | 9/2009 | Nemet | ............. | G06K 19/06028 235/375 |
| 2009/0303052 A1* | 12/2009 | Aklepi | ................... | G06Q 10/08 340/573.2 |
| 2012/0089409 A1* | 4/2012 | Pawar | .................. | G06Q 10/083 705/1.1 |
| 2013/0036068 A1* | 2/2013 | Smith | .................. | G06Q 10/083 705/332 |

OTHER PUBLICATIONS

Bijwaard, "Industry: Using dynamic WSNs in smart logistics for fruits and pharmacy", 2011, In Proceedings of the 9th ACM Conference on Embedded Networked Sensor Systems, ACM, pp. 218-231 (Year: 2011).*

Ruiz-Garcia, "A Review of Wireless Sensor Technologies and Applications in Agriculture and Food Industry: State of the Art and Current Trends," 2009, Sensors, vol. 9, No. 6, pp. 4728-4750 (Year: 2009).*

* cited by examiner

INTELLIGENT ROUTING CODE FOR IMPROVED PRODUCT DISTRIBUTION

RELATED APPLICATIONS

This application claims priority to U.S. patent application Ser. No. 14/729,713 filed Jun. 3, 2015, which claims priority to U.S. Provisional Patent Application No. 62/007,225, filed Jun. 3, 2014, which are herein incorporated by reference as though set forth in full.

FIELD OF THE INVENTION

The present invention relates to product distribution, and more particularly, this invention relates to systems and methods for improving product distribution efficiency.

BACKGROUND

Today's supply chains are becoming more and more complex as products are shipped over longer distances and across international boundaries. For companies shipping products (also referred to herein as Shippers) that are sensitive to time, temperature, humidity, etc., or otherwise considered perishable products, there is a challenge in ensuring the products are managed properly, arrive in a desirable condition and within a defined delivery time. Furthermore, for companies receiving products (also referred to herein as Receivers) that are sensitive to time, temperature, humidity, etc., or other perishable products, there is a need for ensuring the products being received have been handled properly, are in desirable condition and are within defined delivery times. Often the impact of mishandling is not visually apparent, and therefore invisible to the receiver without product condition monitoring throughout distribution.

However, even with product condition monitoring, Shippers are currently unable to utilize product data collected during the shipping process until after the product has been delivered to the Receiver. Therefore, Shippers may not realize that a shipment of perishable products has surpassed a product tolerance until after it has been delivered to the Receiver, e.g., after receipt, upon their inspection. It should be noted that the terms "product" and "goods" as used in various embodiments herein both represent the product a Shipper ships to a Receiver and are used interchangeably within this document.

BRIEF SUMMARY

A computer-implemented method for managing a product delivery process, according to one embodiment, includes receiving an actual Intelligent Routing (IR) code for a good, the good being a perishable food product. A target IR code for each of at least two receivers is also received. The actual IR code for the good is compared to the target IR codes for each of the at least two receivers. Based on the comparison of the actual IR code for the good to the target IR codes for each of the at least two receivers, a determination as to which receiver of the at least two receivers will receive the good. A result of the determination is output. The actual IR code is updated based on sensor data received from a sensor coupled to the good, and recompared to the target IR codes for each of the at least two receivers. Based on the recomparison of the actual IR code for the good to the target IR codes for each of the at least two receivers, a redetermination is made as to which receiver of the at least two receivers will receive the good. A result of the redetermination is output.

A system according to one embodiment includes a processor and logic executable by the processor, the logic being configured to cause the processor to perform the foregoing method.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1A:
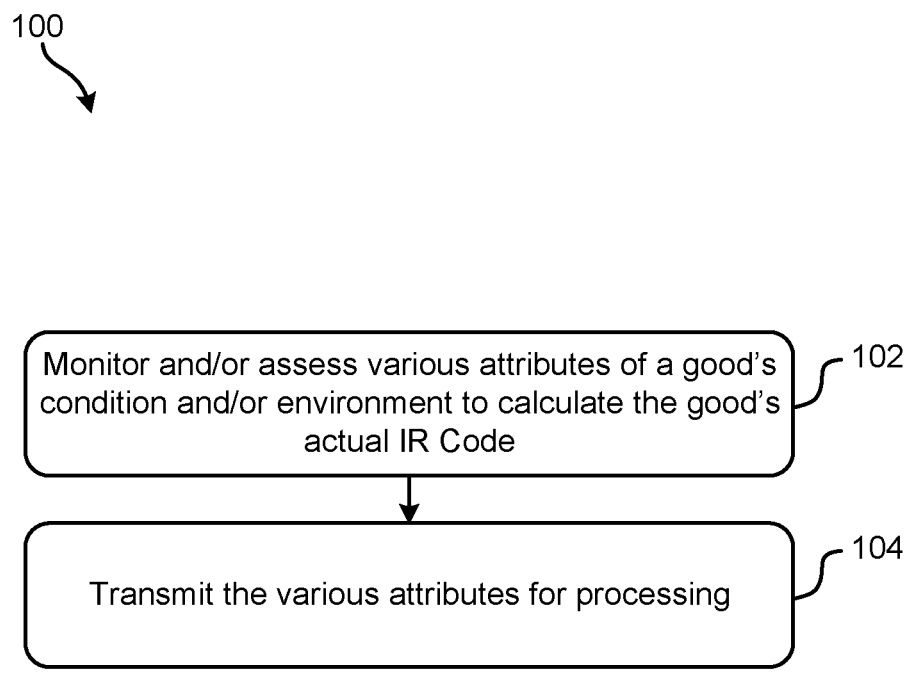
FIG. 1A is a flowchart of a method for monitoring a condition of goods, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments for achieving improved product distribution efficiency and/or related systems and methods thereof.

As described above, in preferred embodiments, a product's actual IR Code may be extrapolated from the past and current condition of a product being shipped. In some approaches, RFID tags continuously monitor product conditions, recording sensor readings at a configured scan interval (e.g. 10 minutes). Analytics evaluate the sensor history combined with product specific data and calculate the actual or current IR Code. Therefore, the product's actual IR Code will reflect the current, dynamic characteristics (e.g., freshness) of the product. In addition, a Receiver's target IR Code may be calculated from the expected (e.g., ideal) handling and/or required minimum standard, which may be determined by the Receiver based requirements. Thus, the target IR Code may represent a target freshness condition of a product or goods based on a target delivery date and customer freshness requirements, e.g., particularly for perishable goods or products.

It follows that Shippers may compare a Receiver's target IR Code with a product's actual IR Code to effectively match the current condition and extrapolated remaining life of a product being shipped with receiver requirements and/or a variety of shipping durations to improve product distribution efficiency. It should be noted that, as referred to herein, a product's actual IR Code is preferably "greater than or equal to" a Receiver's target IR Code when compared thereto. For example, if the target IR Code for a specific checkpoint is 100, it is preferred that the actual IR Code is greater than or equal to 100 at that checkpoint. However, the term "greater than or equal to" is in no way intended to limit the invention. In other embodiments, the target IR Code and actual IR Code may have different preferred relative values.

Depending on the desired embodiment, the Receiver's target IR Code may offer the benefit of providing a single metric for various perishable products by incorporating the Receiver (e.g., customer) requirements. The target IR Code also provides a shipping goal (e.g., objective) for the Shipper, while the product's actual IR Code provides a dynamically calculated metric based on continuous product condition monitoring, as will be discussed in detail below.

According to one embodiment, the actual IR Code may be determined using one or more methods. FIG. 1A depicts a method 100 for monitoring a condition and/or environment of goods, in accordance with one embodiment. As an option, the present method 100 may be implemented in conjunction with features from any other embodiment listed herein, such as those described with reference to the other FIGS, such as FIGS. 2-4. Of course, however, such method 100 and others presented herein may be used in various applications and/or in permutations which may or may not be specifically described in the illustrative embodiments listed herein. Further, the method 100 presented herein may be used in any desired environment. Thus FIG. 1A (and the other FIGS.) should be deemed to include any and all possible permutations.

Referring now to FIG. 1A, the method 100 includes monitoring and/or assessing various attributes of a good's condition and/or environment to calculate the good's actual IR Code. See operation 102. Operation 102 is preferably performed continuously, e.g., at predetermined intervals in time, location, etc.; upon meeting one or more given conditions; etc. In various embodiments, Receivers may desire that an actual IR code of the good be updated as new condition data is obtained. Accordingly, attributes associated with the condition of a good may be monitored utilizing one or more tag and/or reader devices, as set forth in more detail below, where the tag may be affixed to a container of the good, or placed in close proximity to the good.

The various attributes that are monitored or assessed may include one or more of humidity, pH levels, temperature, sunlight, ultraviolet light, chemicals, radioactivity, pathogens, presence of bacteria, presence of viruses, presence of prions, carbon dioxide level, etc., or any other data which would be desired and/or apparent to one skilled in the art upon reading the present description. In other embodiments, the various attributes may include any information on environmental characteristic that may affect the shelf life or expiration of the good being monitored.

Further, at operation 104, the various attributes of the good's condition are transmitted for processing. In some embodiments, the various attributes of the good's condition may be transmitted utilizing a network, such as a wireless network. In one embodiment, the attributes associated with the condition of the good may be transmitted by one or more tag and/or reader devices, as set forth in more detail below. Additionally, the various attributes associated with the condition of the good may be received utilizing a sensor network, described in more detail below.

Further, the various attributes of the good's condition and/or environment may be transmitted to a cloud-based processing system. In such an embodiment, the cloud-based processing system may receive the various attributes, and calculate an actual IR code for the good, as will be set forth below in more detail.

Figure 1B:
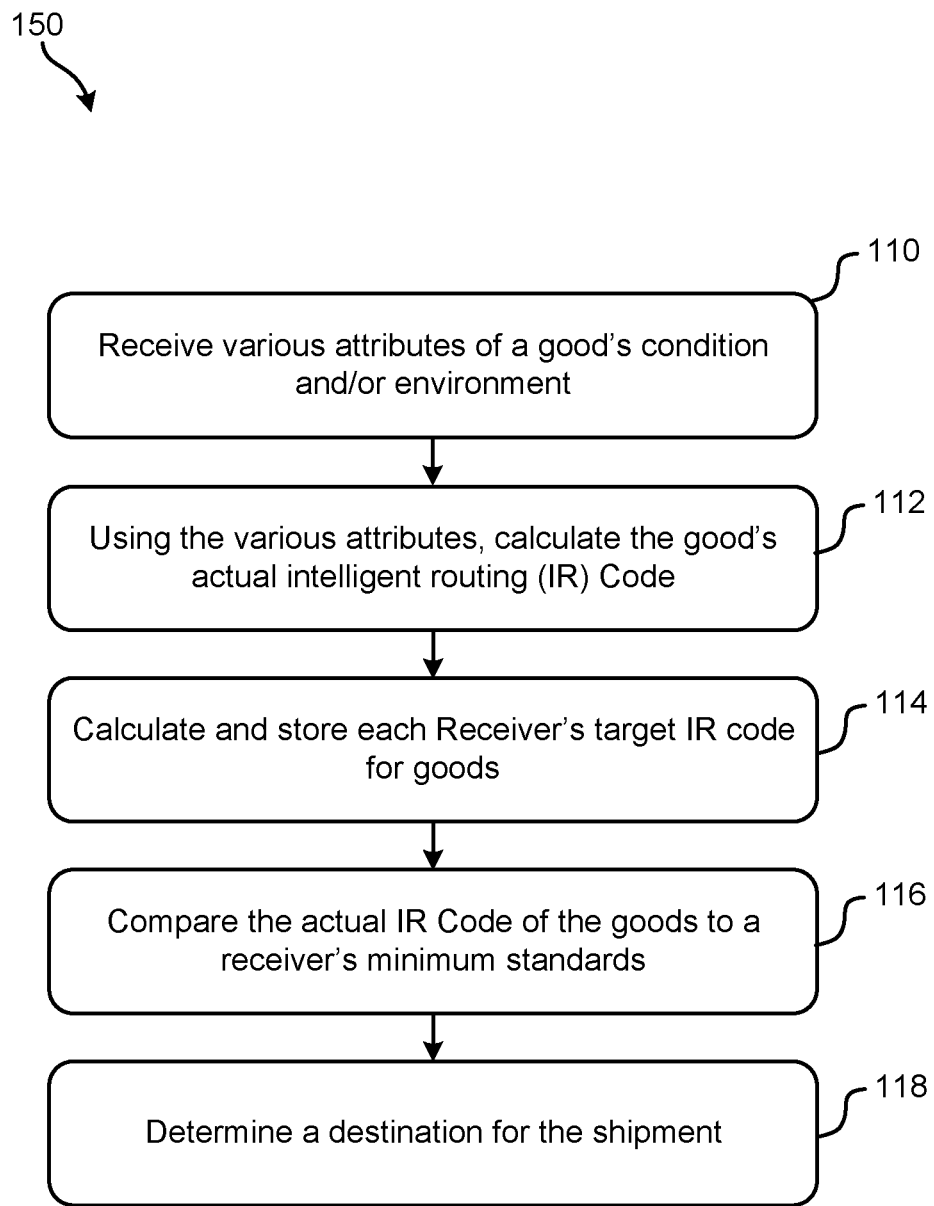
FIG. 1B is a flowchart of a method for processing goods based on condition, according to another embodiment.

FIG. 1B depicts a method 150 for processing goods based on condition, in accordance with one embodiment. As an option, the present method 150 may be implemented in conjunction with features from any other embodiment listed herein, such as those described with reference to the other FIGS, such as FIGS. 2-4. Of course, however, such method 150 and others presented herein may be used in various applications and/or in permutations which may or may not be specifically described in the illustrative embodiments listed herein. Further, the method 150 presented herein may be used in any desired environment. Thus FIG. 1B (and the other FIGS.) should be deemed to include any and all possible permutations.

Referring now to FIG. 1B, the method 150 includes receiving various attributes of a good's condition and/or environment. See operation 110. In some embodiments, the various attributes of the good's condition may be received utilizing a network, such as a wireless network. In one embodiment, the various attributes of the good's condition may be received utilizing a sensor network, described in more detail below.

Operation 110 is preferably performed continuously, e.g., at predetermined intervals in time, location, etc.; upon meeting one or more given conditions; etc. In various embodiments, Receivers may desire that an actual IR code of the good be updated as new condition data is obtained.

Method 150 further includes calculating and storing each Receiver's target IR Code for goods, e.g., based on criteria, such as: expected shelf and/or product life of goods, a current condition of the goods, past conditions of the goods, past handling of the goods, future distribution time, quantified ripening acceleration impact from various pre-harvest, harvest and post-harvest environmental conditions, data reflecting the goods ongoing environmental and/or operating condition and/or handling, customer freshness requirements, etc. See operations 112-114. Thus an intelligent routing code may represent a target quality condition or operational use of a product. Moreover, a target IR Code may include the timeliness of the delivery date and customer quality requirements.

Calculations of the actual IR Code are preferably performed in a cloud-based processing system, but may be performed in any type of processing system, depending on the desired embodiment. In one embodiment, the operations 110-118 of the method 150 may be performed by a cloud-based processing system. Cloud-based processing systems may be preferred because they have access to updated algorithms, broad accessibility, substantial storage, and processing power, etc. Thus, some embodiments described herein may include an on-demand or always-connected communication to a server or Cloud to provide constant monitoring and updates. The actual IR Codes, after being calculated, may be stored in storage that is accessible to the cloud-based processing system, such as a cloud-based storage system. Moreover, one or more target IR Codes may also be calculated in a cloud-based processing system. Further, the target IR Codes, after being calculated, may be stored in storage that is accessible to the cloud-based processing system, such as a cloud-based storage system.

When calculating an actual IR Code for a particular good, the actual IR Code may initially assume ideal criteria (e.g., listed above) during handling. However, as the product progresses along the delivery process, non-ideal handling criteria may be sensed and stored to later adjust the actual IR Code, e.g., on demand or as events unfold.

The product's actual IR Code may be updated in real time, however according to other approaches, the actual IR Code may be updated upon request, periodically, sporadically, event triggered, or location triggered, at checkpoints during the delivery process, etc., depending on the desired embodiment as will soon become apparent. In a specific approach, the intelligent routing code associated with particular goods may be updated when a sensor network access point and/or reader device (e.g., RFID reader, etc.) autonomously pushes or publishes sensor data from continuously monitoring the conditions of the goods and stores that data, e.g., on the RFID tag, sensor device, in a remote location such as cloud-based data storage, etc.

However, in some embodiments, in the absence of access to sensor data the intelligent routing code may be calculated and updated by a system (e.g., by a cloud-based processing system) in a predictive manner based on inferred or proximate conditions.

For example, in one embodiment, where sensor data is not accessible, the intelligent routing code may be calculated and updated over time based on anticipated changes in temperature and a last read temperature. For example, a cargo environment holding goods may be expected to experience routine temperature changes, and data regarding these routine temperature changes may be utilized to predict a latest actual IR code of the goods when a sensor affixed to the goods is inaccessible.

As another example, where sensor data of a given sensor is not accessible (e.g., a particular sensor is too far from a given reader), the intelligent routing code may be calculated and updated based on proxy sensor data. The proxy sensor data may be received from one or more other sensors attached to goods stored in the same general location as the given sensor. In on specific embodiment, the given sensor may be located in a cargo environment in such a manner that it is shielded from any reader. However, proxy sensor data may be obtained from other sensors in the cargo environment for the purposes of calculating an actual IR code for the goods associated with the given sensor.

Accordingly, the actual IR Code preferably represents a present freshness condition of the goods, as determined using past and/or current sensor readings, e.g., as part of a calculation for remaining freshness or product life. According to one approach, sensor network devices (e.g., RFID sensors, Bluetooth sensors, WiFi sensors, etc.) may be used to collect data pertaining to a present freshness condition of the goods. Moreover, in other approaches, sensor network devices may be used to continuously collect data pertaining to the present freshness condition of the goods. Therefore, although the actual and/or target IR Code may be calculated in a cloud-based processing system, the IR Codes, and any data reflecting the goods ongoing environmental condition and/or handling, may then be stored in an RFID tag, one or more sensors of a sensor network, a cloud-based system, etc., as will be described in further detail below.

With continued reference to the method 150 of FIG. 1B, operation 116 includes comparing the actual IR Code of the goods to a receiver's minimum standards, e.g., a target IR Code. In various embodiments, the current condition, the past conditions, and/or past handling may be based on one or more of: distribution time, product handling, post-harvest environmental conditions, pre-harvest environmental conditions, etc. According to a preferred approach, the actual IR Code normalizes these requirements for any type of perishable product. Moreover, as will be described in further detail below, a receiver's target IR Code may be based, at least in part, on any of the aforementioned factors, e.g., such as Receiver minimum standards. Therefore by comparing the actual IR Code and target IR Code, a single normalized exchange metric is desirably developed which provides a target metric for the Shipper, while also providing a single goal metric for the Receiver.

Moreover, operation 118 of method 150 includes determining a destination for the shipment, e.g., such that the destination is the optimum selection based on ranking the results of comparing the actual IR Code with the target IR Code of multiple destinations. As will soon become apparent, comparing the good's actual IR Code and the receiver's target IR Code provides a Shipper the ability to evaluate locations where a shipment of a product may be shipped to, while ensuring that the product arrives in a desirable condition and within a defined time. Furthermore, the expected future distribution times may additionally or alternatively influence the good's actual IR Code and/or the shipment destination itself.

According to various approaches, a shipment may include any quantity of products, for example a unit quantity, case quantity, pallet quantity, trailer(s) quantity, etc. Moreover, a shipment may be transferred between a Shipper and Receiver, which may include any trading partner within the supply chain from the original product manufacturer to the end consumer.

Figure 2A:
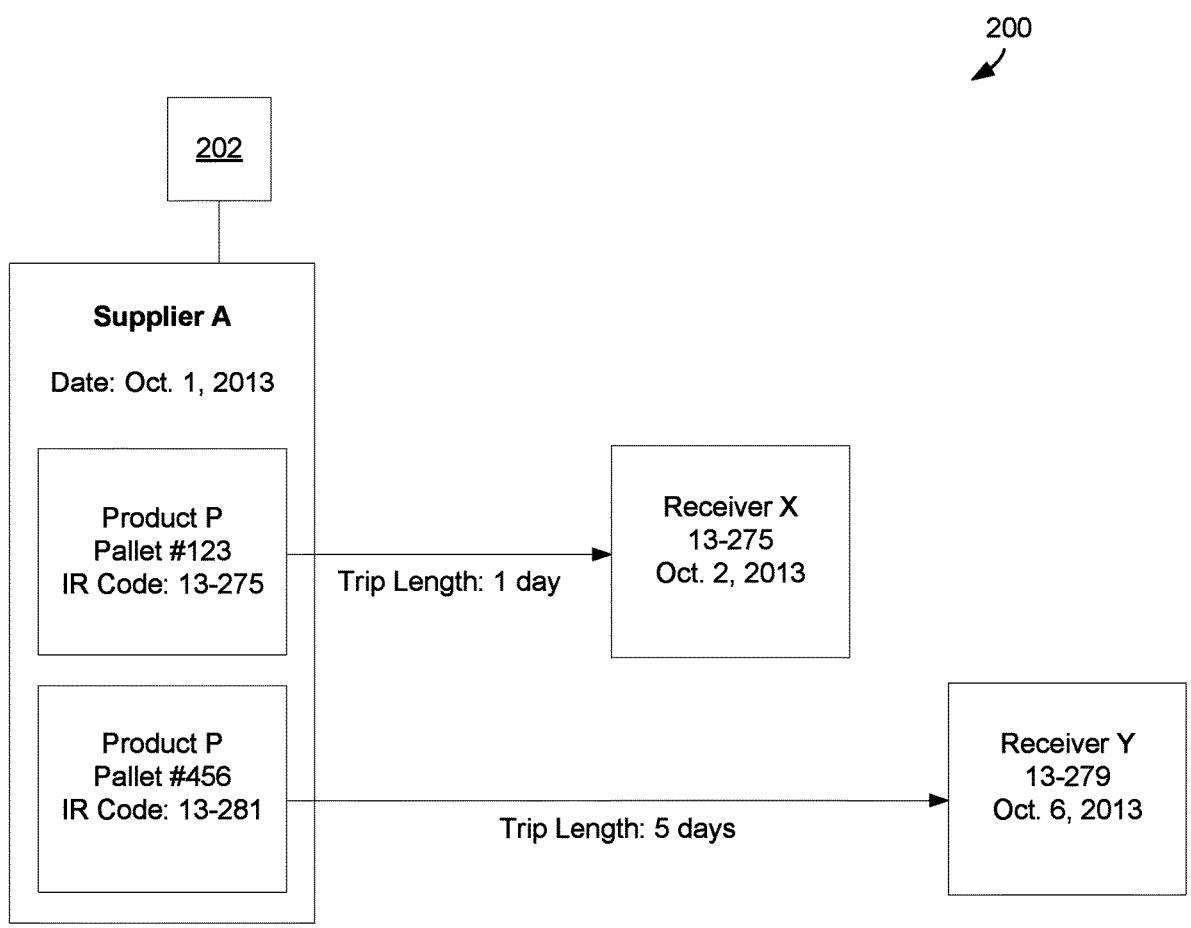
FIG. 2A is a representative diagram of a supply chain, according to one embodiment.

FIG. 2A depicts a representative diagram 200 of a supply chain according to an embodiment. As an option, the present diagram 200 may be implemented in conjunction with features from any other embodiment listed herein, such as those described with reference to the other FIGS. herein. Of course, however, such diagram 200 and others presented herein may be used in various applications and/or in permutations which may or may not be specifically described in the illustrative embodiments listed herein. Further, the diagram 200 presented herein may be used in any desired environment. Thus FIG. 2A (and the other FIGS.) should be deemed to include any and all possible permutations.

Referring now to the embodiment illustrated in the diagram 200 of FIG. 2A, the supply chain therein illustrates Supplier A shipping Product P to both Receiver X and Receiver Y. For the following discussion of FIG. 2A, it is assumed that Pallet #123 and Pallet #456 of Product P were harvested on the same day. The shipping time between Supplier A and Receivers X and Y is 1 day and 5 days, respectively. Therefore, the time required for a product to be transported from Supplier A and arrive at Receiver X is 1 day, while the time required for a product to be transported from Supplier A and arrive at Receiver Y is 5 days. Moreover, it should be noted that for illustrative purposes of the present embodiment, the supply chain of the diagram 200 is evaluated on the date of Oct. 1, 2013.

With continued reference to the embodiment of FIG. 2A, Supplier A manufactures and ships Product P in pallet quantities, numbering each pallet with a unique pallet number. However, as described above, in various approaches, a shipment may include any quantity of product, for example a unit quantity, case quantity, trailer(s) quantity, etc.

It should also be noted that in the context of FIG. 2A, it is assumed that both Receiver X and Receiver Y have identical requirements with respect to future distribution time, product handling, Receiver freshness requirements, etc., thus the defining difference between the target IR Codes for Receiver X and Receiver Y will be the difference in transit time. In particular, in the context of FIG. 2A, it may be assumed that both Receiver X and Receiver Y intend to utilize Product P as soon as it is received, and neither Receiver X nor Receiver Y have requirements with respect to a shelf-life of Product P beyond the date of receipt.

Moreover, in the present embodiment, Product P represents a temperature sensitive product. Specifically, the useful life (e.g., shelf life) of Product P is highly dependent on the time and temperature each pallet of Product P has experienced. Thus, although the same product (i.e., pallets of Product P harvested on the same day) is being delivered to Receivers X and Y, depending on each pallet's unique exposure to different temperatures for different periods of time, each pallet may have different actual IR Codes prior to shipping. Therefore, it is desirable that an actual IR Code be calculated to determine the condition of Pallet #123 and Pallet #456 based on each pallet's respective exposure to time and temperature.

A target IR Code may be calculated for each order from Receiver X and/or Receiver Y, e.g., based on each Receiver's minimum standards. By comparing a pallet's actual IR Code with a Receiver's target IR Code, the Shipper and/or Receiver may determine if the product meets or has breached any Receiver requirement thresholds at any point during the shipping or delivery process (including at the point of delivery).

Further, in some approaches the total remaining/expected shelf life and/or remaining quality of each of the pallets may be determined continuously, as will be discussed in detail below. Thus, by having the ability to continuously evaluate and/or compare the actual IR Code (e.g., past handling of the product) and a Receiver's target IR Code (e.g., Receiver minimum standards) during the shipping or delivery process, it may be ensured that any delivered product meets the Receiver's standards.

With continued reference to FIG. 2A, processor 202 preferably includes logic integrated with and/or executable by the processor to perform one or more of the operations of method 150 illustrated in FIG. 1B. The processor 202 may be a component in a hardware environment for performing one or more of the operations of method 150 illustrated in FIG. 1B. In one embodiment, the processor 202 may include a central processing unit, such as a hardware microprocessor. The processor 202 may be hardware installed in a workstation or server computer that performs cloud-based processing.

Such a workstation or server may further include one or more of Random Access Memory (RAM), Read Only Memory (ROM), an I/O adapter for connecting peripheral devices such as disk storage units to a bus, a user interface adapter for connecting a keyboard, a mouse, or other user interface devices to the bus, a communication adapter for connecting the workstation to a communication network, and a display adapter for connecting the bus to a display device.

The workstation or server may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. The logic executable by the processor may be written using JAVA, XML, C, C++, or any other programming language.

In various embodiments, Receiver requirements may vary for each Receiver, and their associated target IR Codes would reflect these differences as well. For example, Receiver A may require cheese (Product C) be delivered with an actual IR Code that is greater than or equal to a target IR Code with a higher standard of product handling, freshness requirements, etc. than Receiver B requires the same Product C be delivered with. According to the present example, Receiver A may be a high-end restaurant which demands a high target IR Code, corresponding to higher quality product delivery, than Receiver B, which may be a farmers market or other local produce vendor with a lower target IR Code.

Referring again to the embodiment illustrated in FIG. 2A, Pallet #123 has experienced adverse temperatures for longer periods of time than Pallet #456. An adverse temperature may include any temperature that is above or below a desired temperature range for Product P. Storing Product P outside of its desired temperature range may increase chances of spoilage, fasten ripening, etc. Pallet #123, therefore, has a lower actual IR Code (e.g., shorter shelf life) than Pallet #456, due to the temperature handling conditions each of the pallets have experienced. As described above, an actual IR Code may be calculated to illustrate this difference in exposure between the pallets, which may then be used to improve delivery efficiency as will soon become apparent.

Although the present embodiment depends mainly on the product's exposure to time and temperature, according to various other embodiments, the actual IR Code may incorporate one or more of humidity, pH levels, temperature, sunlight, ultraviolet light, chemicals, radioactivity, pathogens, presence of bacteria, presence of viruses, presence of prions, carbon dioxide level, etc., or any other data which would be desired and/or apparent to one skilled in the art upon reading the present description.

As shown, Pallet #123 corresponds to a calculated actual IR Code of 13-275. In the present embodiment, 13 represents the year and 275 represents the number of the day of the year. In one embodiment, this coding scheme may indicate that the Product P goods of Pallet #123 are calculated to expire on the $275^{th}$ day of the year 2013 (i.e., Oct. 2, 2013). The expiration of the goods may include any point in time after which the goods are no longer considered to be fresh, or adequate for use as intended by the Receiver. Thus, a Receiver's target IR code may indicate the last day of the year that the goods are considered usable by the Receiver. This coding scheme is provided as an example only and is in no way intended to limit the invention. According to various other embodiments, any desired coding scheme may be implemented.

On the other hand, Pallet #456 has experienced more favorable temperature conditions than Pallet #123, and as a result Pallet #456 has an actual IR Code of 13-281, which is higher than the actual IR Code of Pallet #123. In one embodiment, this coding scheme may indicate that the Product P goods of Pallet #456 are calculated to expire on the $281^{st}$ day of the year 2013 (i.e., Oct. 8, 2013). The expiration of the goods may include any point in time after which the goods are no longer considered to be fresh, or adequate for use as intended by the Receiver. Thus, a Receiver's target IR code may indicate the last day of the year that the goods are considered usable by the Receiver.

As mentioned above, an actual IR Code may also incorporate expected supply chain routing options to indicate which routes each pallet can be sent on to maximize each pallet's useful life. Thus, at this point in the delivery process, the actual IR Code of each of the pallets may be compared with the target IR Codes of each of the Receivers corresponding to this point in the delivery process as well.

Looking to FIG. 2A, Receiver X has a target IR Code of 13-275 and a delivery date of Oct. 2, 2013 while Receiver Y has a target IR Code of 13-279 and a delivery date of Oct. 6, 2013. Comparing the target IR Codes and the actual IR Codes of the pallets, it becomes apparent that the actual IR Code of Pallet #123 (13-275) is equal to the target IR Code of Receiver X (13-275), but less than the target IR Code of Receiver Y (13-279). In view of the description presented above, an actual IR Code is preferably greater than or equal to a target IR Code when compared thereto. Otherwise, the product fails/will fail to meet the Receiver's product requirements, thereby allowing the Receiver to refuse acceptance of the product at or before delivery of the product.

With this in mind, the Supplier A may ship a product to any Receiver having an equal to or lower target IR Code than the actual IR Code corresponding to the product being shipped. Thus, referring again to the example of FIG. 2A, Pallet #123, having an actual IR Code of 13-275, may be shipped to Receiver X, but not Receiver Y. Again, this is because the actual IR Code of Pallet #123 (13-275) is equal to the target IR Code of Receiver X (13-275), but less than the target IR Code of Receiver Y (13-279).

However, as mentioned above, Pallet #456 has an actual IR Code of 13-281, which is a higher actual IR Code than that of Pallet #123, and the target IR Codes of both Receiver X (13-275) and Receiver Y (13-279). Therefore, Pallet #456, having an actual IR Code of 13-281, may be shipped to either Receiver X or Receiver Y. This information may be used by Supplier A to improve the efficiency of the delivery process and avoid lost revenue, as will be described in further detail below.

Put another way, the actual IR Code of 13-275 for Pallet #123 indicates that to comply with its product requirements upon delivery, Pallet #123 should arrive at its Receiver location by a target date of the $275^{th}$ day of the year 2013 (i.e., Oct. 2, 2013), or sooner. Thus, based on this actual IR Code and the time required to reach each Receiver (e.g., the shipping trip length), Supplier A can ship Pallet #123 to any Receiver location with a shipping trip length of 1 day or less. According to the present example, and as mentioned above, the embodiment illustrated in FIG. 2A is evaluated on the date of Oct. 1, 2013. Thus, a shipping trip length of 1 day or less would allow for Pallet #123 to be delivered on or before Oct. 2, 2013 pursuant to the calculated actual IR Code of 13-275.

Applying the foregoing information to the system illustrated in FIG. 2A, Receiver X has a shipping trip length of 1 day. Thus, Supplier A can ship Pallet #123 to Receiver X and maximize the useful life of Pallet #123 by delivering the product corresponding to Pallet #123 prior to its deadline of Oct. 2, 2013.

However, Pallet #456 has experienced more favorable temperature conditions than Pallet #123, and as a result, Pallet #456 has an actual IR Code of 13-281. Therefore, Pallet #456 may be shipped to any Receiver location where it will arrive by the $281^{st}$ day of 2013 (i.e., Oct. 8, 2013), or sooner. Applying this information to the embodiment of FIG. 2A, because Receiver Y has a shipping trip length of 5 days, Supplier A can ship Pallet #456 to Receiver Y and it will arrive on the $279^{th}$ day of 2013 (i.e., Oct. 6, 2013), sooner than Pallet #456's actual IR Code of 13-281.

When compared to conventional distribution systems, the desirable results of implementing any of the embodiments described herein become readily apparent. As seen in conventional systems, if Supplier A did not have access to actual or target IR Codes for routing guidance, Supplier A may ship Pallet #123 to Receiver Y having a longer shipping trip length (5 days), while Pallet #456 may be shipped to Receiver X. As a result, Pallet #123 would expire prior to arriving at Receiver Y, thereby resulting in wasted product and lost revenue.

Conversely, as described above with reference to FIG. 2A, the actual IR Code was able to incorporate Product P's current condition, past conditions, and past handling to determine the future shelf life of Product P. Thus, Supplier A was able to optimize the different actual IR Codes of Pallet #456 and Pallet #123 respectively, intelligently routing the pallets to Receiver locations that met each Receiver's target IR Code requirements in addition to improving the efficiency of the delivery process and avoiding lost revenue for Supplier A.

Furthermore, both Receiver X and Receiver Y are able to verify the condition of the pallets upon receiving them by comparing the actual IR Codes thereof with the Receiver's own target IR Code. Thus, various embodiments allow for a Receiver to ensure each product unit is in desirable condition and within required standard, e.g., determined by the Receiver's target IR Code, at the time of delivery. However, according to further embodiments, a Receiver may be able to compare the actual IR Code of a product with a target IR Code associated therewith at any point during the delivery process. Thus, a Receiver may be able to determine if a product has experienced unfavorable conditions while being shipped and/or during the delivery process, thereby allowing the Receiver to foresee if the actual IR Code of the product will be greater than or equal to the corresponding target IR Code at a future delivery date, and act accordingly. This allows the Receiver valuable insight to the delivery process of their product.

Although the embodiment illustrated in FIG. 2A uses delivery dates to express the IR Codes, according to various other approaches, the IR Codes may additionally include data pertaining to various other product requirements, including, but not limited to, requirements for future required shelf life, expiration date, etc.

Figure 2B:
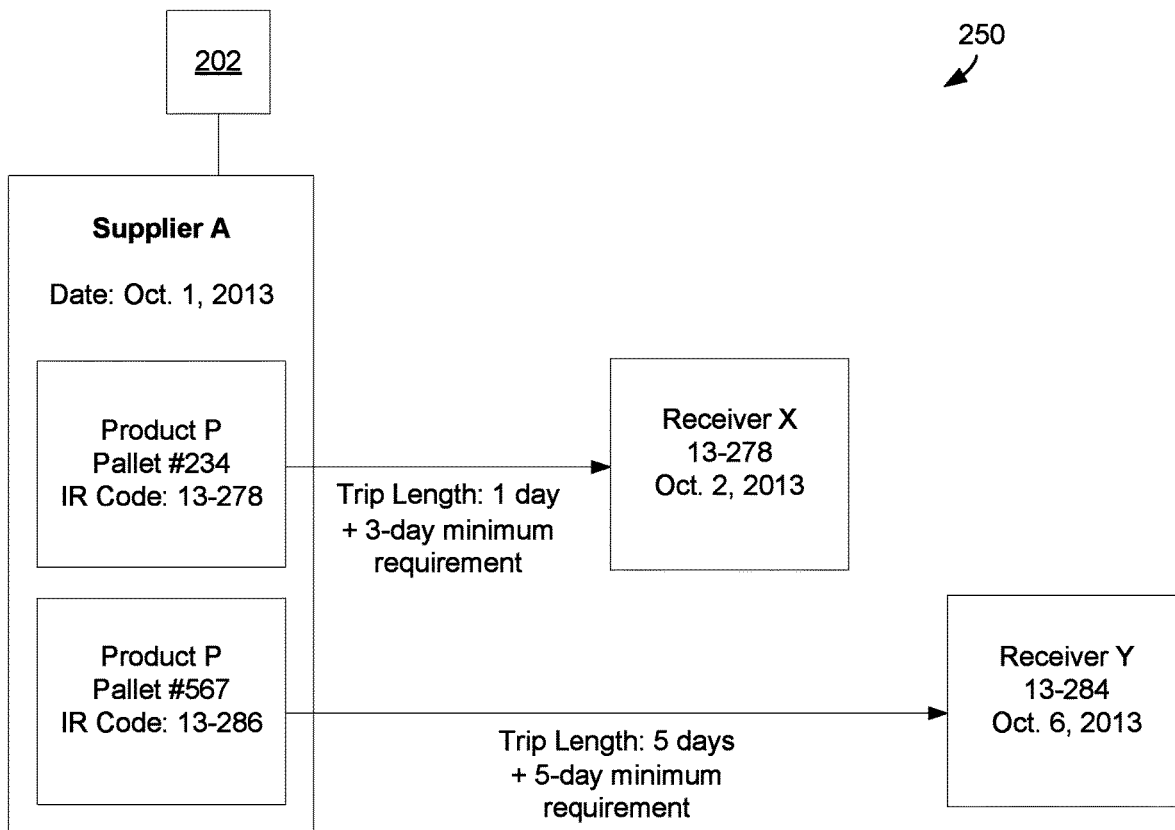
FIG. 2B is a representative diagram of a supply chain, according to another embodiment.

FIG. 2B depicts a representative diagram 250 of a supply chain according to an embodiment. As an option, the present diagram 250 may be implemented in conjunction with features from any other embodiment listed herein, such as those described with reference to the other FIGS. herein. Of course, however, such diagram 250 and others presented herein may be used in various applications and/or in permutations which may or may not be specifically described in the illustrative embodiments listed herein. Further, the diagram 250 presented herein may be used in any desired environment. Thus FIG. 2B (and the other FIGS.) should be deemed to include any and all possible permutations.

Referring now to the embodiment illustrated in the diagram 250 of FIG. 2B, the supply chain therein illustrates Supplier A shipping Product P to both Receiver X and Receiver Y. For the following discussion of FIG. 2B, it is assumed that Pallet #234 and Pallet #567 of Product P were harvested on the same day. Similar to FIG. 2A, it should be noted that for illustrative purposes of the present embodiment, the supply chain of the diagram 250 is evaluated on the date of Oct. 1, 2013.

As shown in FIG. 2B, the shipping time between Supplier A and Receivers X and Y is 1 day and 5 days, respectively. Therefore, the time required for a product to be transported from Supplier A and arrive at Receiver X is 1 day, while the time required for a product to be transported from Supplier A and arrive at Receiver Y is 5 days.

Additionally, Receiver X has required a 3-day minimum requirement, and Receiver Y has required a 5-day minimum requirement. In various embodiments, a minimum requirement includes a minimum period of time that the Receiver will be in possession of the goods prior to the expiration of the goods. Thus, in the context of the supply chain of FIG. 2B, Receiver X has required possession of Product P for a minimum of 3 days prior to the expiration of Product P; and Receiver Y has required possession of Product P for a minimum of 5 days prior to the expiration of Product P.

While minimum requirements of 3 days and 5 days are described in the context of FIG. 2B, it is understood that minimum requirements may be specified that are greater than or less than 3 days, and greater than or less than 5 days for various Receivers. Further, for simplicity the minimum requirements are described herein as being measured in "days," but it is understood that minimum requirements may be specified by one or more Receivers in other terms, such as minutes, hours, weeks, months, etc.

With continued reference to the embodiment of FIG. 2B, Supplier A manufactures and ships Product P in pallet quantities, numbering each pallet with a unique pallet number. However, as described above, in various approaches, a shipment may include any quantity of product, for example a unit quantity, case quantity, trailer(s) quantity, etc.

Moreover, in the present embodiment, Product P represents a temperature sensitive product. Specifically, the useful life (e.g., shelf life) of Product P is highly dependent on the time and temperature each pallet of Product P has experienced. Thus, although the same product (i.e., pallets of Product P harvested on the same day) is being delivered to Receivers X and Y, depending on each pallet's unique exposure to different temperatures for different periods of time, each pallet may have different actual IR Codes prior to shipping. Therefore, it is desirable that an actual IR Code be calculated to determine the condition of Pallet #234 and Pallet #567 based on each pallet's respective exposure to time and temperature.

Moreover, a target IR Code may be calculated for each order from Receiver X and/or Receiver Y, e.g., based on each Receiver's minimum standards and the desired delivery date. Each Receiver's minimum standards may include the minimum requirement (e.g., 3-day minimum requirement, 5-day minimum requirement, etc.) set forth by the Receiver for continued freshness past the desired delivery date, so that the received product does not expire earlier than desired. Further still, each Receiver will include a delivery date, in addition to the minimum requirement set forth by the Receiver. Accordingly, in one embodiment, a target IR Code may be calculated for a Receiver based on the Receiver's requested delivery date+the Receiver's minimum requirements. Known shipping or transit times may be utilized to ensure that each Receiver's minimum standards are satisfied.

As noted above, by comparing a pallet's actual IR Code with a Receiver's target IR Code, the Shipper and/or Receiver may determine if the product meets or has breached any Receiver requirement thresholds at any point during the shipping or delivery process (including at the point of delivery). Further, in some approaches the total remaining shelf life and/or remaining quality of each of the pallets may be determined continuously, as will be discussed in detail below. Thus, by having the ability to continuously evaluate and/or compare the actual IR Code (e.g., past handling of the product) and a Receiver's target IR Code (e.g., Receiver minimum standards) during the shipping or delivery process, it may be ensured that any delivered product meets the Receiver's standards.

With continued reference to FIG. 2B, processor 202 may be substantially identical to the processor 202 described in the context of FIG. 2A.

As shown in FIG. 2B, Pallet #234 has experienced adverse temperatures for longer periods of time than Pallet #567. An adverse temperature may include any temperature that is above or below a desired temperature range for Product P. Storing Product P outside of its desired temperature range may increase chances of spoilage, fasten ripening, etc. Pallet #234, therefore, has a lower actual IR Code (e.g., shorter shelf life) than Pallet #567, due to the temperature handling conditions each of the pallets have experienced. As described above, an actual IR Code may be calculated to illustrate this difference in exposure between the pallets, which may then be used to improve delivery efficiency as will soon become apparent.

Although the present embodiment depends mainly on the product's exposure to time and temperature, according to various other embodiments, the actual IR Code may incorporate one or more of humidity, pH levels, temperature, sunlight, ultraviolet light, chemicals, radioactivity, pathogens, presence of bacteria, presence of viruses, presence of prions, carbon dioxide level, etc., or any other data which would be desired and/or apparent to one skilled in the art upon reading the present description.

As shown in FIG. 2B, Pallet #234 corresponds to a calculated actual IR Code of 13-278. In the present embodiment, 13 represents the year and 278 represents the number of the day of the year. In one embodiment, this coding scheme may indicate that the Product P goods of Pallet #234 are calculated to expire on the $278^{th}$ day of the year 2013 (i.e., Oct. 5, 2015). The expiration of the goods may include any point in time after which the goods are no longer considered to be fresh, or adequate for use as intended by the Receiver. Thus, a Receiver's target IR code may indicate the last day of the year that the goods are considered usable by the Receiver. This coding scheme is provided as an example only and is in no way intended to limit the invention. According to various other embodiments, any desired coding scheme may be implemented.

On the other hand, Pallet #567 has experienced more favorable temperature conditions than Pallet #234, and as a result Pallet #567 has an actual IR Code of 13-286, which is higher than the actual IR Code of Pallet #234. In one embodiment, this coding scheme may indicate that the Product P goods of Pallet #567 are calculated to expire on the $286^{th}$ day of the year 2013 (i.e., Oct. 13, 2013). The expiration of the goods may include any point in time after which the goods are no longer considered to be fresh, or adequate for use as intended by the Receiver. Thus, a Receiver's target IR code may indicate the last day of the year that the goods are considered usable by the Receiver.

As mentioned above, an actual IR Code may also incorporate expected supply chain routing options to indicate which routes each pallet can be sent on to maximize each pallet's useful life. Thus, at this point in the delivery process, the actual IR Code of each of the pallets may be compared with the target IR Codes of each of the Receivers corresponding to this point in the delivery process as well.

Looking to FIG. 2B, Receiver X has a target IR Code of 13-278, which is equivalent to a delivery date of Oct. 2, 2013 and a 3-day minimum requirement; while Receiver Y has a target IR Code of 13-284, which is equivalent to a delivery date of Oct. 6, 2013 and a 5-day minimum requirement. Comparing the target IR Codes and the actual IR Codes of the pallets, it becomes apparent that the actual IR Code of Pallet #234 (13-278) is equal to the target IR Code of Receiver X (13-278), but less than the target IR Code of Receiver Y (13-284). In view of the description presented above, an actual IR Code is preferably greater than or equal to a target IR Code when compared thereto. Otherwise, the product fails/will fail to meet the Receiver's product requirements, thereby allowing the Receiver to refuse acceptance of the product at or before delivery of the product.

With this in mind, the Supplier A may ship a product to any Receiver having an equal to or lower target IR Code than the actual IR Code corresponding to the product being shipped. Thus, referring again to the example of FIG. 2B, Pallet #234, having an actual IR Code of 13-278, may be shipped to Receiver X, but not Receiver Y. Again, this is because the actual IR Code of Pallet #234 (13-278) is equal to the target IR Code of Receiver X (13-278), but less than the target IR Code of Receiver Y (13-284).

However, as mentioned above, Pallet #567 has an actual IR Code of 13-286, which is a higher actual IR Code than that of Pallet #234, and the target IR Codes of both Receiver X (13-278) and Receiver Y(13-284). Therefore, Pallet #567, having an actual IR Code of 13-286, may be shipped to either Receiver X, or Receiver Y. This information may be used by Supplier A to improve the efficiency of the delivery process and avoid lost revenue, as will be described in further detail below.

Put another way, the actual IR Code of 13-278 for Pallet #234 indicates that to comply with Receiver X product requirements upon delivery (e.g., 3-day minimum requirements, etc.), Pallet #234 should arrive at its Receiver location by a target date of the $275^{th}$ day of the year 2013 (i.e., Oct. 2, 2013), or sooner, as Receiver X has a minimum requirement of 3 days and a target IR code of 13-278. According to the present example, and as noted above, the embodiment illustrated in FIG. 2B is evaluated on the date of Oct. 1, 2013. Thus, a shipping trip length of 1 day or less would allow for Pallet #234 to be delivered on or before Oct. 2, 2013, and meet the 3-day minimum requirements of Receiver X, pursuant to the calculated target IR Code of 13-278.

Applying the foregoing information to the system illustrated in FIG. 2B, Receiver X has a shipping trip length of 1 day, and a 3-day minimum requirement. Thus, Supplier A can ship Pallet #234 to Receiver X and maximize the useful life of Pallet #234 by delivering Pallet #234 prior to a deadline of Oct. 2, 2013, which allows for the 3-day minimum requirement of Receiver X corresponding to the target IR code of 13-278.

However, Pallet #567 has experienced more favorable temperature conditions than Pallet #234, and as a result, Pallet #567 has an actual IR Code of 13-286. Therefore, Pallet #567 may be shipped to any receiver whose target IR code is less than or equal to 13-286. Receiver Y has a shipping trip length of 5 days and a 5-day minimum requirement. Thus, if Supplier A ships Pallet #567 to Receiver Y on Oct. 1, 2013, Pallet #567 will arrive at Receiver Y on the $279^{th}$ day of 2013 (i.e., Oct. 6, 2013). The arrival of Pallet #567 (with an actual IR code of 13-286) at Receiver Y on the $279^{th}$ day of 2013 adequately allows for the 5-day minimum requirement of Receiver Y built in to Receiver Y's target IR code of 13-284 (corresponding to Oct. 11, 2013).

When compared to conventional distribution systems, the desirable results of implementing any of the embodiments described herein become readily apparent. As seen in conventional systems, if Supplier A did not have access to actual or target IR Codes for routing guidance, Supplier A may ship Pallet #234 to Receiver Y having a longer shipping trip length (5 days), while Pallet #567 may be shipped to Receiver X. As a result, Pallet #234 would expire prior to arriving at Receiver Y, thereby resulting in wasted product and lost revenue.

Conversely, as described above with reference to FIG. 2B, the actual IR Code was able to incorporate Product P's current condition, past conditions, and past handling to determine the future shelf life of Product P. Thus, Supplier A was able to optimize the different actual IR Codes of Pallet #567 and Pallet #234 respectively, intelligently routing the pallets to Receiver locations that met each Receiver's target IR Code requirements in addition to improving the efficiency of the delivery process and avoiding lost revenue for Supplier A.

Furthermore, both Receiver X and Receiver Y are able to verify the condition of the pallets upon receiving them by comparing the actual IR Codes thereof with the Receiver's own target IR Code. Thus, various embodiments allow for a Receiver to ensure each product unit is in desirable condition and within required standard, e.g., determined by the Receiver's target IR Code, minimum requirements at the time of delivery. However, according to further embodiments, a Receiver may be able to compare the actual IR Codes of a product with target IR Codes associated therewith at any point during the delivery process. Thus, a Receiver may be able to determine if a product has experienced unfavorable conditions while being shipped and/or during the delivery process, thereby allowing the Receiver to foresee if the actual IR Code of the product will be greater than or equal to the corresponding target IR Code at a future delivery date, and act accordingly. This allows the Receiver valuable insight to the delivery process of their product.

In some embodiments, comparing the actual IR Code with a target IR Code may allow a Shipper to automatically determine acceptance of the goods by the Receiver. For example, if upon delivery the actual IR Code of a product is within the Receiver's target IR Code for that product, the Shipper may automatically determine acceptance of the product. This may favorably increase efficiency of the billing process, cash flow, etc.

Similarly, in other embodiments, comparing the actual IR code with a target IR Code may allow a Shipper and/or Receiver to determine and identify non-compliant goods at a given point during the preparation and/or delivery process. As a result, the Receiver and/or the Shipper may be automatically notified of the specific non-compliant goods and current location. In some approaches, a claim may be automatically generated when the non-compliant goods are identified. In a preferred approach, the claim may notify the Shipper of the Receiver's refusal to accept the non-compliant goods, e.g., even if the goods have not been delivered yet.

However, in other approaches, upon identifying non-compliant goods at a given point during the preparation and/or delivery process, the Supplier and/or Receiver may be able to offer or request a discount, credit, or some other form of compensation to be awarded to the Receiver based on the non-compliant goods. Moreover, the compensation may be scaled based on the degree of non-compliance (e.g., a relative difference between target and actual IR codes) of the goods.

Using this coding scheme provides a simplified means for a Receiver to determine the present condition of any perishable product being received and ensure that the products have been delivered within a targeted time and condition, e.g., defined by a Receiver. Thus, a target IR Code may be defined by a Receiver and supplied to a Shipper (e.g., in a purchase order) who may use the target IR Code. Using the target IR Code means the Receiver does not need to differentiate for different ripening rates of the wide variety of perishable fruit, produce, dairy, seafood, meat or fresh prepared foods they frequently receive from suppliers. Rather, the Receiver(s) may simply match the actual IR Code for a product with the corresponding target IR Code to determine if the product is being delivered in desirable condition and within required standard.

Any of the embodiments described herein may incorporate a sensor network to continuously monitor the environment of handling of the goods at a unit level (e.g. individual product, carton, case, box, pallet, container, trailer, sea van, ULD, etc.). According to one approach, a sensor network may include sensors of various protocols and standards, e.g., ZigBee, low-power BlueTooth, WiFi, GSM or cellular connectivity, satellite communications, etc., or other networks of sensors that have the ability to communicate with each other. Depending on the desired embodiment, the network of sensors may communicate with each other in a mesh topology, peer-to-peer, etc. As a result, wireless sensor networks have the desired benefit of allowing continuous access to any sensor of the network by accessing any other sensor.

In different embodiments, sensors of a sensor network may be distributed along the delivery supply chain (e.g. transit points, toll ways, ports, airports, weigh stations, truck stops, facility gates or entrances, storage facilities, processing facilities, etc.), or amongst the product being delivered. According to an example, a truck or container (e.g. trailer, sea van, ULD) full of cartons (goods) may be shipped with one sensor coupled to each of the cartons. Moreover, when the truck arrives at a checkpoint/location the sensor network may be accessed from, a fixed or mobile reader/access point outside the truck/trailer or container may read the sensors, or someone may open the back of the truck to read the sensors with a reader. In some scenarios, a signal may be too weak to reach each of the sensors in the whole truck (e.g., near the front of the truck). However, the wireless sensor network allows for the reader in the present example to access all of the sensors in the truck, including the ones that were not reached due to the strength of the signal. Here, the reader only needs to access at least one of the sensors to communicate with each of the sensors in the truck. Moreover, in some approaches, a mobile access point may be included in part, or all, of the shipment. The mobile access point will communicate with one or more sensor devices similar to the aforementioned access point/readers, which may then forward the sensor device data to a local or remote server or cloud-based processing system.

In some embodiments, condition data and/or handling data may be obtained from sensors of the sensor network that are distributed along the delivery supply chain and not coupled to the goods. In these embodiments, the condition data and/or handling data may provide information regarding environmental conditions. For example, in one embodiment, temperature and/or humidity data may be obtained from sensors that are not attached to any of the goods. In such an embodiment, the temperature and/or humidity data may include a temperature or humidity before or at the time of harvest of the goods being shipped. For some fruits and vegetables, the temperature or humidity before or at the time of harvest may be useful for calculating a shelf life or expiration date of the goods. In some embodiments, the condition data and/or handling data may be obtained from auxiliary sources, such as weather information networks, publicly-accessible data networks, etc. In this manner, a more accurate actual IR code may be calculated for goods based on information from auxiliary sources.

Any of the embodiments described herein may incorporate a RFID system, e.g., to monitor a product being delivered and/or to determine an actual IR Code. According to one approach, the current condition of a shipment may be monitored by one or more RFID tags. Furthermore, the one or more RFID tags may communicate with an RFID reader and/or sensor network access point, either of which may be configured to perform at least one of the method steps illustrated in FIG. 1A.

Figure 3:
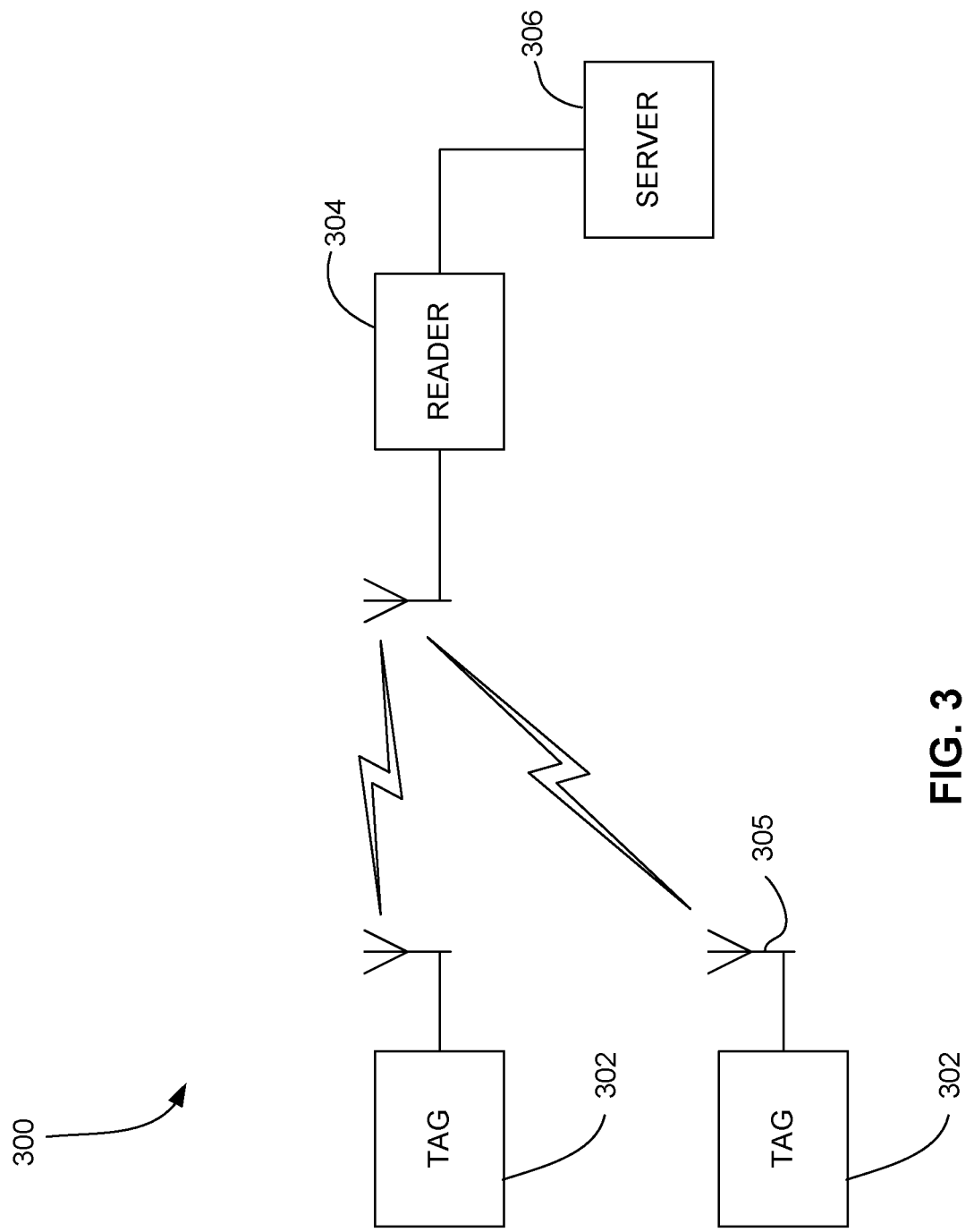
FIG. 3 is a system diagram of a sensor network, according to one embodiment.

According to an embodiment, FIG. 3 depicts a sensor network 300, which may include some or all of the following components and/or other components. As an option, the sensor network 300 may be implemented in conjunction with features from any other embodiment listed herein, such as those described with reference to the other FIGS. Of course, however, the sensor network 300 and others presented herein may be used in various applications and/or in permutations which may or may not be specifically described in the illustrative embodiments listed herein. Further, the sensor network 300 presented herein may be used in any desired environment. Thus FIG. 3 (and the other FIGS.) should be deemed to include any and all possible permutations.

As shown in FIG. 3, one or more tags 302 are present. As used herein, each tag may comprise any label attached to a good for the purpose of identification, or to provide other information, or be a device located in close association and/or proximity to a unit quantity of goods. In some embodiments, the sensor network 300 may include a RFID system. In such embodiments, each of the tags 302 may comprise a RFID tag. Further, the RFID tags may include RFID and/or sensor network devices, e.g., depending on the desired embodiment. For example, each RFID tag may include a controller, a sensor and memory, which are preferably embodied on a single chip as described below, but may also or alternatively include a different type of controller, such as an application specific integrated circuit (ASIC), processor, an external memory module, etc. Of course, however, the one or more tags 302 may include Bluetooth-enabled tags, ZigBee tags, WiFi tags, cellular data tags, etc.

For purposes of the present discussion, the tags 302 will be described as including a chip. Each tag 302 may further include or be coupled to an antenna 305.

An illustrative chip is disclosed below, though actual implementations may vary depending on communication protocols and how the device is to be used. In general terms, a preferred chip includes one or more of a power supply circuit to extract and regulate power from a reader signal or a DC power source such as a battery or capacitor; a detector to decode signals from the reader; a backscatter modulator and/or transmitter to send data back to the reader; anti-collision protocol circuits; a sensor to monitor a specific condition; and at least enough memory to store its unique identification code, e.g., Electronic Product Code (EPC) and a sensor reading.

In some embodiments, each of the tags 302 may include a controller with on-board memory, a controller, and external memory, a controller with an on-board sensor, a controller and external sensor, etc.

Each of the tags 302 may be coupled to an object or item associated with a product being monitored, such as an article of manufacture, a container (e.g. box, carton, case, tote, cart, bin, pallet, ULD, sea van, etc.), a processing or storage location, a device, a person, etc. According to one approach, one or more of the tags 302 may be used to collect data pertaining to a present environmental, operational or freshness condition of the product being monitored. Therefore, any data reflecting the product's ongoing environmental condition and/or handling, along with a unique identification code (e.g. EPC), may then be transmitted to and stored by a cloud-based system, such as a cloud-based processing system, etc.

With continued reference to FIG. 3, a remote device 304 such as an access point, interrogator, or "reader" communicates with the tags 302 via an air interface, preferably using standard protocols. An "air interface" refers to any type of wireless communications mechanism. In one embodiment, wherein the tags 302 comprise RFID tags, the air interface may include the radio-frequency signal between the RFID tags and the remote device. One or more of the tags 302 may execute computer commands that the tag 302 receives from the remote device 304.

The sensor network 300 may also include an optional backend system such as a server 306, which may include databases containing information and/or instructions relating to the tags 302 and/or tagged items. In some approaches, server 306 may be a local or remote server, and may be logically connected either directly or over a network such as the Internet, a cellular network, a private wire line or wireless network, etc. In one embodiment, the server 306 may comprise one or more servers that are hosted in the cloud, which may also be referred to herein as cloud-based processing systems. Thus, although the server 306 is illustrated in FIG. 3 as being connected to the remote device 304 via a physical connection, in some embodiments the server 306 may be connected to the remote device 304 wirelessly.

Any data gathered and/or stored by the tags 302 or other sensor devices may be referred to as device data. Such data may be uploaded and stored on a cloud-based data storage and/or management system.

According to a preferred approach, the "data" may include sensor data collected by the tags 302, product data, traceability and waypoint data, supplier related data, shipping data, as well as other metadata. In a preferred approach, the tags 302 and other sensor network devices sensor may detect any number of environmental conditions and/or conditions of an object to which the sensor is attached or proximate to. According to various approaches, the sensor data may include, but is not limited to humidity, pH, temperature, sunlight, ultraviolet light, chemicals, radioactivity, pathogens, presence of bacteria, presence of viruses, presence of prions, gases (e.g. carbon dioxide level, oxygen level, ethylene level, nitrogen level, etc.), etc., or any other data which would be desired and/or apparent to one skilled in the art upon reading the present description.

According to an embodiment, the data may further include an association of the tags and a product to which the tags may be directly or indirectly coupled. Moreover, the data received from the tags may include unique product information regarding the product to which the tags may be directly or indirectly coupled, as will be discussed in further detail below.

In one approach, a remote device 304 may process some or all of the data collected by a tag 302. In another approach, some or all of the data collected by a tag 302 may be transmitted to a server 306 for processing. The data may be processed to obtain processed data, which may include one or more IR Codes. The processed data may then be delivered directly to a user e.g., via an email, a printed list, etc.; uploaded to a cloud-based data management system; sent to a remote device and/or computer application for processing and/or display; accessible to an owner e.g., as a summary, the raw data, a representational graph, etc.; etc. Thus, in one particular approach, a summary of the information pertinent to a particular owner may be provided thereto by accessing the cloud-based data management system.

According to various approaches, a summary of tag data may be compiled into a graph, a chart, a table, a list, etc. In one example, the summary of tag data may incorporate a table which may include one, some, or all of an event time, the last temperature, the last temperature log time, number of extreme high alarms, the number of extreme low alarms, the number of high alarms, the number of low alarms, the number of temperature logs, the number of way point logs, RSSI state, etc.

According to yet another approach, the tag data may incorporate thresholds (e.g., high, low, specific values, etc.) according to any of the embodiments described herein. In one approach, portions of the tag data may be evaluated, thereby forming summaries e.g., quality factor, average, median, standard deviation, effective life of a product, etc. In varying approaches, data summaries may be compared to the aforementioned thresholds, stored on the cloud-based data storage system, output to an approved owner, etc. In one example, once a produce shipment is delivered to a Receiver, the data management system may compile the tag data gathered during the delivery process, compare it to one or more threshold, and calculate an actual IR Code which preferably includes at least an approximation of the remaining shelf life of the produce. This actual IR Code may be available to the Receiver by any approach described and/or suggested herein, e.g., for comparison with an expected target IR Code value that may correspond to a target value provided by the Receiver on a purchase order. It follows that, upon comparing the actual IR Code with the target IR Code, the Receiver may be able to accept at full price or a discount, or reject the delivery from the Shipper based on the approximated shelf life and/or other factors.

According to several of the embodiments described and/or suggested herein, the actual and target IR Codes offer the benefit of providing: a single metric for all perishable products by incorporating customer requirements, a shipping goal for the Shipper, and a dynamically calculated metric based on product condition monitoring. In other words, actual and target IR Codes normalize the process of assessing quality in delivering products from a Shipper to a Receiver with a single exchange metric to the benefit of both the Shipper and the Receiver.

Thus, as mentioned above, tags or sensor network devices and/or tag readers or network access points may be used in combination with the system illustrated in FIGS. 2A-2B. Moreover, a reader or network access point may be configured to perform at least one of the method steps shown in FIGS. 1A-1B. In yet further embodiments, any of the approaches described herein may be implemented within a business entity's (e.g. Shipper) operations to measure the business' own adherence to process standards, e.g., using as a metric to measure if an operation has met defined conditions and/or is completed.

With continued reference to FIG. 3, as noted above, each of the tags 302 may be associated with a unique identifier. Such identifier is preferably an EPC code, but may additionally or alternatively be a UPC code, a PLU code, or a supplier name and batch or lot number. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged. Additional fields may also be used as part of the EPC in order to properly encode and decode information from different numbering systems into their native (human-readable) forms.

Each tag 302 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the tag. These databases do not reside on the tag, but rather are linked to the tag through a unique identifier(s) or reference key(s).

As noted above, in some embodiments the tags 302 may include one or more RFID tags. For such embodiments, Auto ID Center EPC-Compliant tag classes are set forth below:

Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~300 to ~1,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to find a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 4:
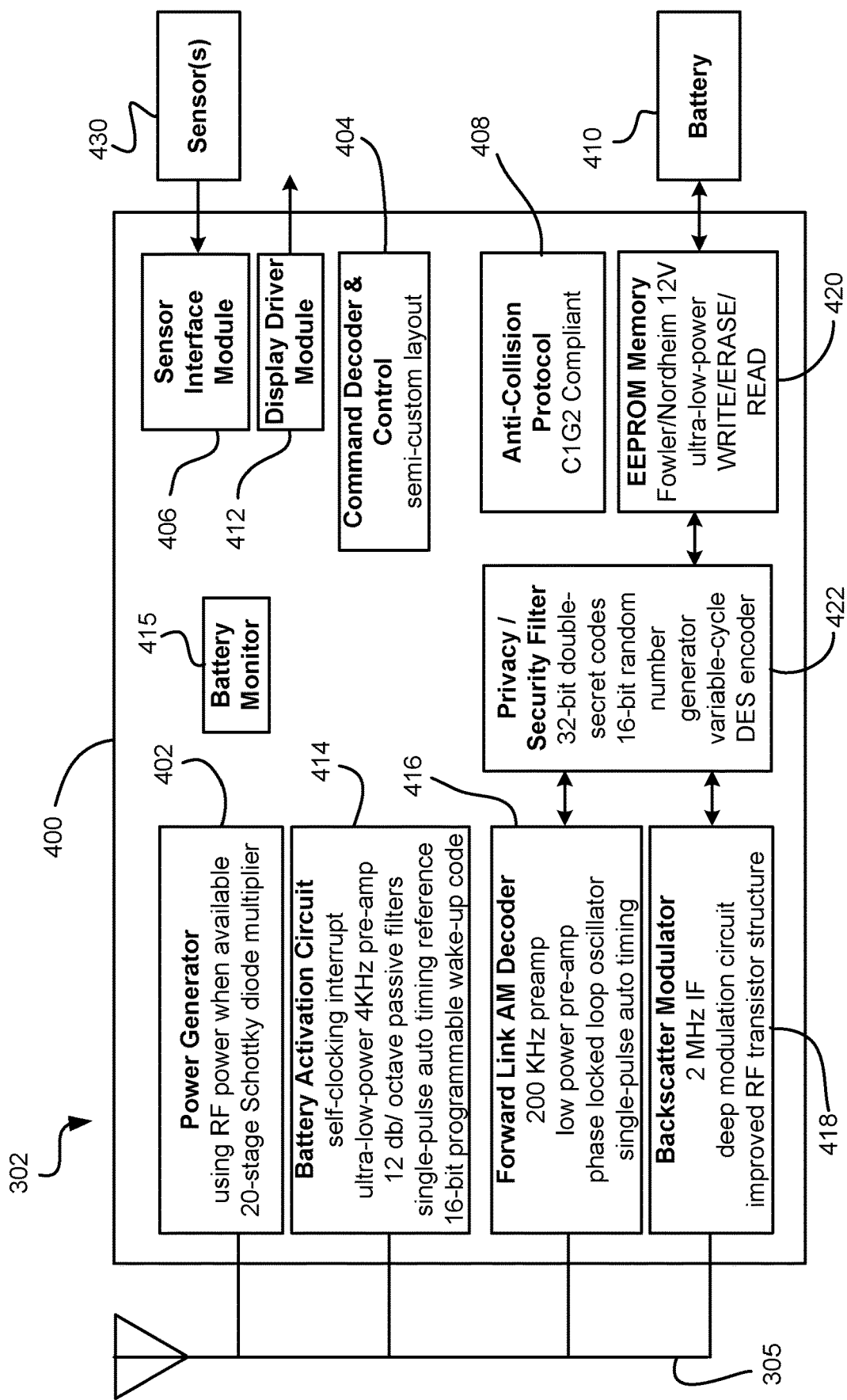
FIG. 4 is a system diagram for an integrated circuit (IC) chip for implementation in an RFID device, according to one embodiment.

Embodiments including an RFID device are preferably implemented in conjunction with a Class-3 or higher Class IC chip, which typically contains the processing and control circuitry for most if not all tag operations, and a sensor 430. FIG. 4 depicts a conceptual circuit layout of a Class-3 IC 400 and the various control circuitry according to an illustrative embodiment for implementation in an RFID device implemented as a tag 302 (e.g., an RFID tag). It should be noted that the methods and systems disclosed herein may be implemented using any type of RFID device, and the circuit 400 is presented as only one possible implementation.

The Class-3 IC of FIG. 4 can form the core of RFID chips appropriate for many applications such as identification of pallets, cartons, containers, vehicles, or anything where a range of more than 2-3 meters is desired. As shown, the circuit 400 includes several circuits including a power generation and regulation circuit 402, a digital command decoder and control circuit 404, a sensor interface module 406, a C1G2 interface protocol circuit 408, a battery activation circuit 414, a battery monitor 415, one or more sensors 430, and a power source (battery) 410. A display driver module 412 can be added to drive a display.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

A forward link AM decoder 416 uses a simplified phase-lock-loop oscillator that requires only a small amount of chip area. Preferably, the circuit 416 requires only a minimum string of reference pulses.

A backscatter modulator block 418 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 420 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

The circuit 400 may also incorporate a security encryption circuit 422 for operating under one or more security schemes, secret handshakes with readers, etc.

According to various embodiments, RFID tags may not function properly and/or efficiently in certain conditions and/or locations. In one example, an RFID tag may be intended to monitor one or more conditions such as temperature within a metal shipping container that may contain a perishable product being delivered to a Receiver as described above. However, the shipping container's metal structure may inhibit the RFID tag from communicating, e.g., receiving instructions, transmitting data, relaying an error, etc., with an RFID tag reader. Placing the RFID tag on the exterior of the container may remedy the communication problems, but then the RFID tag has no access to the conditions in the interior of the container.

To remedy the foregoing, an RFID tag may have an interface adapted to communicate with a sensor which is external and/or coupleable to the RFID tag, thereby allowing an RFID tag to maintain communication with an RFID tag reader while gathering readings in conditions and/or locations that otherwise could be problematic for RF communications.

In any of the embodiments, techniques and/or hardware known in the art may be used to implement the various operations.

While various embodiments have been described above, it should be understood that they have been presented by way of example only, and not limitation. Thus, the breadth and scope of a preferred embodiment should not be limited by any of the above-described embodiments, but should be defined only in accordance with the following claims and their equivalents.

What is claimed is:

1. A computer-implemented method for managing a product delivery process, the method comprising:
    calculating, by the computer, a unique actual Intelligent Routing (IR) code for a good, the good being perishable food product, the actual IR code being a single metric, wherein the actual IR code for the good is calculated based at least in part on condition data obtained from a weather information network;
    receiving, by the computer, a target IR code for each of at least two receivers;
    comparing, by the computer, the actual IR code for the good to the target IR codes for each of the at least two receivers, wherein each of the target IR codes is a single metric of a same type as the single metric of the actual IR code, wherein the actual IR code represents a remaining shelf life of the good and each of the target IR codes for each of the at least two receivers represents a required shelf life of the good;
    based on the comparison of the actual IR code for the good to the target IR codes for each of the at least two receivers, determining, by the computer, which receiver of the at least two receivers will receive the good;
    outputting, by the computer, a result of the determination;
    updating, by the computer, the actual IR code based on sensor data received from a sensor coupled to the good during transportation of the good and prior to reaching a destination in response to the sensor data being accessible;
    in response to sensor data from the sensor coupled to the good being inaccessible, updating, by the computer, the actual IR code based on inferred sensor data, wherein the inferred sensor data is based on routine temperature changes associated with historical shipments of substantially similar goods;
    recomparing, by the computer, during the transportation of the good and prior to reaching the destination, the actual IR code for the good to the target IR codes for each of the at least two receivers;
    based on the recomparison of the actual IR code for the good to the target IR codes for each of the at least two receivers, redetermining, by the computer, which receiver of the at least two receivers will receive the good; and
    outputting, by the computer, a result of the redetermination.

2. The method as recited in claim 1, wherein the actual IR code is also updated each time the comparison is made.

3. The method as recited in claim 1, wherein the actual IR code is updated in response to occurrence of a triggering event, wherein the triggering event includes at least a sensor reading passing a predetermined threshold.

4. The method as recited in claim 1, wherein the actual IR code is updated in response to the good reaching a predetermined location.

5. The method as recited in claim 1, wherein the sensor data is received at least in part via a cellular network.

6. The method as recited in claim 1, wherein the actual IR code includes a single string of alphanumeric characters representing a count of days of a year, wherein the actual IR code count of days represents the last day of the year the good is considered to be useable, wherein each target IR code includes a single string of alphanumeric characters of the same format as the actual IR code.

7. The method as recited in claim 1, wherein the actual IR code represents a shelf life of the good, wherein higher quality requirements are reflected by a positive difference between the actual IR code and one of the target IR codes.

8. The method as recited in claim 1, wherein the actual IR code represents an expiration date of the perishable food product.

9. The method as recited in claim 1, wherein the result of the determination is output as an electronic message.

10. The method as recited in claim 1, wherein the result of the determination is output to a cloud-based data management system.

11. The method as recited in claim 1, wherein comparing the actual IR code for the good to the target IR codes for each of the at least two receivers includes determining that the actual IR code is greater than or equal to the target IR code of the receiver determined to receive the good.

12. The method as recited in claim 1, wherein each target IR code represents a combination of a delivery date requirement of the associated receiver plus a requested minimum remaining shelf life of each good of the receiver, thereby reflecting a target expiration date for each good.

13. The method as recited in claim 12, wherein the target IR code includes a group of characters listing the delivery date requirement plus the requested minimum remaining shelf life of each good of the receiver.

14. A system comprising:
    a processor and logic executable by the processor, the logic being configured to cause the processor to perform a method comprising:
        calculating a unique actual Intelligent Routing (IR) code for a good, the good being a perishable food product, the actual IR code being a single metric, wherein the actual IR code for the good is calculated based at least in part on condition data obtained from a weather information network;

receiving a target IR code for each of at least two receivers;

comparing the actual IR code for the good to the target IR codes for each of the at least two receivers, wherein each of the target IR codes is a single metric of a same type as the single metric of the actual IR code, wherein the actual IR code represents a remaining shelf life of the good and each of the target IR codes for each of the at least two receivers represents a required shelf life of the good;

based on the comparison of the actual IR code for the good to the target IR codes for each of the at least two receivers, determining which receiver of the at least two receivers will receive the good;

outputting a result of the determination;

updating the actual IR code based on sensor data received from a sensor coupled to the good during transportation of the good and prior to reaching a destination in response to the sensor data being accessible;

in response to sensor data from the sensor coupled to the good being inaccessible, updating the actual IR code based on inferred sensor data, wherein the inferred sensor data is based on routine temperature changes associated with historical shipments of substantially similar goods;

recomparing, during the transportation of the good and prior to reaching the destination, the actual IR code for the good to the target IR codes for each of the at least two receivers;

based on the recomparison of the actual IR code for the good to the target IR codes for each of the at least two receivers, redetermining which receiver of the at least two receivers will receive the good; and outputting a result of the redetermination.

15. The system as recited in claim 14, wherein the actual IR code is updated each time the comparison is made.

16. The system as recited in claim 14, wherein the actual IR code is updated in response to occurrence of a triggering event, wherein the triggering event includes at least a sensor reading passing a predetermined threshold.

17. The system as recited in claim 14, wherein the actual IR code is updated in response to the good reaching a predetermined location.

18. The system as recited in claim 14, wherein the actual IR code represents a shelf life of the good, wherein higher quality requirements are reflected by a positive difference between the actual IR code and one of the target IR codes.

19. The system as recited in claim 14, wherein the actual IR code represents an expiration date of the perishable food product.

20. The system as recited in claim 14, wherein the actual IR code includes a single string of alphanumeric characters representing a count of days of a year, wherein the actual IR code count of days represents the last day of the year the good is considered to be useable, wherein each target IR code includes a single string of alphanumeric characters of the same format as the actual IR code.

21. The system as recited in claim 14, wherein the actual IR code represents at least one attribute of the good selected from the group consisting of: a shelf life of the good and an expiration date of the good.

22. The system as recited in claim 14, wherein comparing the actual IR code for the good to the target IR codes for each of the at least two receivers includes determining that the actual IR code is greater than or equal to the target IR code of the receiver determined to receive the good.

23. The system as recited in claim 14, wherein each target IR code represents a combination of a delivery date requirement of the associated receive plus a requested minimum remaining shelf life of each good of the receiver, thereby reflecting a target expiration date for each good.

24. The system as recited in claim 14, wherein the target IR code includes a group of characters listing the delivery date requirement plus the requested minimum remaining shelf life of each good of the receiver.

* * * * *